United States Patent
Uemura et al.

(10) Patent No.: US 11,290,034 B2
(45) Date of Patent: Mar. 29, 2022

(54) MOTOR DRIVING DEVICE AND AIR CONDITIONER

(71) Applicant: Mitsubishi Electric Corporation, Tokyo (JP)

(72) Inventors: Keisuke Uemura, Tokyo (JP);
Kazunori Hatakeyama, Tokyo (JP);
Yuichi Shimizu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/047,499

(22) PCT Filed: Jun. 18, 2018

(86) PCT No.: PCT/JP2018/023053
§ 371 (c)(1),
(2) Date: Oct. 14, 2020

(87) PCT Pub. No.: WO2019/244193
PCT Pub. Date: Dec. 26, 2019

(65) Prior Publication Data
US 2021/0119557 A1    Apr. 22, 2021

(51) Int. Cl.
*H02P 5/46* (2006.01)
*F24F 11/88* (2018.01)
*H02P 3/02* (2006.01)

(52) U.S. Cl.
CPC ............... *H02P 5/46* (2013.01); *F24F 11/88* (2018.01); *H02P 3/02* (2013.01)

(58) Field of Classification Search
CPC ...... H02P 1/00; H02P 1/04; H02P 1/06; H02P 1/08; H02P 1/10; H02P 1/16; H02P 1/18;
(Continued)

(56) References Cited

U.S. PATENT DOCUMENTS

2009/0072772 A1* 3/2009 Fuchs .................... B60L 7/003
318/375
2014/0271237 A1   9/2014 Kozaki
(Continued)

FOREIGN PATENT DOCUMENTS

EP      3091653 A1   11/2016
JP      2006-320128 A   11/2006
(Continued)

OTHER PUBLICATIONS

International Search Report of the International Searching Authority dated Aug. 28, 2018 for the corresponding International application No. PCT/JP2018/023053 (and English translation).
(Continued)

*Primary Examiner* — Antony M Paul
(74) *Attorney, Agent, or Firm* — Posz Law Group, PLC

(57) ABSTRACT

There are provided at least two disconnection contactors each of which switches between connection and disconnection of each of at least two of three second power lines for supplying a three-phase alternating-current voltage generated by an inverter to a second PM motor, at least two short-circuit contactors each of which switches between connection and disconnection between the two second power lines of each of at least two of the pairs of the three second power lines, and a calculator to control the disconnection contactors and short-circuit contactors.

9 Claims, 8 Drawing Sheets

(58) Field of Classification Search
CPC .... H02P 1/24; H02P 1/26; H02P 1/265; H02P 1/28; H02P 1/30; H02P 1/42; H02P 1/46; H02P 1/465; H02P 1/54; H02P 3/00; H02P 3/18; H02P 3/22; H02P 4/00; H02P 5/00; H02P 6/00; H02P 6/06; H02P 6/12; H02P 7/00; H02P 7/292; H02P 9/00; H02P 9/006; H02P 9/007; H02P 9/12; H02P 9/32; H02P 21/00; H02P 21/22; H02P 21/34; H02P 23/00; H02P 23/0027; H02P 23/07; H02P 23/16; H02P 23/28; H02P 25/00; H02P 25/022; H02P 25/03; H02P 25/062; H02P 25/064; H02P 25/08; H02P 25/086; H02P 25/18; H02P 27/00; H02P 27/04; H02P 27/06; H02P 29/00; H02P 29/027; H02P 29/032; H02P 5/46; H02P 3/02; F24F 11/88
See application file for complete search history.

(56) References Cited

U.S. PATENT DOCUMENTS

| | | | |
|---|---|---|---|
| 2016/0167523 | A1 | 6/2016 | Cypers et al. |
| 2017/0292733 | A1 | 10/2017 | Uemura et al. |

FOREIGN PATENT DOCUMENTS

| | | | |
|---|---|---|---|
| JP | 2008-148415 | A | 6/2008 |
| JP | 4305021 | B2 | 7/2009 |
| JP | 4354148 | B2 | 10/2009 |
| JP | 2014-180081 | A | 9/2014 |
| JP | 2016-116448 | A | 6/2016 |
| JP | 2018-085844 | A | 5/2018 |
| WO | 2016/046992 | A1 | 3/2016 |

OTHER PUBLICATIONS

Indian Office Action dated Jul. 14, 2021, issued in corresponding Indian Patent Application No. 202027045562 (and English Machine Translation).

Office Action dated Jul. 6, 2021 in corresponding to JP Application No. 2020-525080 ( and English translation attached).

Extended European Search Report dated Mar. 26, 2021, issued in corresponding European Patent Application No. 18923186.3.

* cited by examiner

| SECOND PM MOTOR | DISCONNECTION CONTACTOR | SHORT-CIRCUIT CONTACTOR |
|---|---|---|
| OPERATION (ENERGIZATION) | ON | OFF |
| STOP (NON-ENERGIZATION) | OFF | ON |

MOTOR DRIVING DEVICE AND AIR CONDITIONER

CROSS REFERENCE TO RELATED APPLICATION

This application is a U.S. national stage application of International Patent Application No. PCT/JP2018/023053 filed on Jun. 18, 2018, the disclosure of which is incorporated herein by reference.

TECHNICAL FIELD

The present invention relates to a motor driving device and an air conditioner.

BACKGROUND

In controlling a motor, an inverter is used. There is a known technique of controlling multiple motors with a single inverter. For example, Patent Literature 1 describes an electric device that drives a first motor having multiple phases and a second motor having the same number of phases as the first motor with a single inverter circuit on the basis of single-mode PWM control in a state where the phases of the first motor and the phases of the second motor are connected to common output lines for the respective phases.

PATENT LITERATURE

Patent Literature 1: Japanese Patent No. 4305021

In air conditioners in which multiple outdoor fan motors are installed, it is common to change the number of driven fan motors depending on the air conditioning load. This is to change the number of driven outdoor fan motors depending on the air conditioning load, and for example, when the air conditioning load is low, only one of the outdoor fan motors is driven, and when the air conditioning load is high, the number of driven outdoor fan motors is increased.

Thus, in a case where the number of driven outdoor fan motors is increased, when an outdoor fan motor that is rotated by a disturbance factor and is in a free-running state is driven, counter electromotive voltage occurs, and excessive inrush current may flow through the fan motor. Further, when permanent magnet synchronous motors (referred to below as PM motors) are used as the fan motors, the excessive inrush current may demagnetize the rotor magnets.

SUMMARY

One or more aspects of the present invention are intended to make it possible, in a motor driving device that drives multiple fan motors with a single inverter, when a fan motor in a free-running state is driven in addition to already driven fan motor(s), to prevent excessive current from flowing through the fan motor and prevent demagnetization of a permanent magnet of the PM motor.

A motor driving device according to an aspect of the present invention is a motor driving device for driving a first permanent magnet synchronous motor and a second permanent magnet synchronous motor, and includes a converter to generate a direct-current voltage; an inverter to generate a three-phase alternating-current voltage from the direct-current voltage; three first power lines to supply the three-phase alternating-current voltage to the first permanent magnet synchronous motor; three second power lines to supply the three-phase alternating-current voltage to the second permanent magnet synchronous motor; at least two disconnection contactors to switch between connection and disconnection of each of at least two of the three second power lines; at least two short-circuit contactors to switch between connection and disconnection between the two second power lines of each of at least two of pairs of the three second power lines; and a controller to control the at least two disconnection contactors and the at least two short-circuit contactors.

An air conditioner according to an aspect of the present invention is an air conditioner including a first permanent magnet synchronous motor; a second permanent magnet synchronous motor; and a motor driving device to drive the first permanent magnet synchronous motor and the second permanent magnet synchronous motor, wherein the motor driving device includes: a converter to generate a direct-current voltage; an inverter to generate a three-phase alternating-current voltage from the direct-current voltage; three first power lines to supply the three-phase alternating-current voltage to the first permanent magnet synchronous motor; three second power lines to supply the three-phase alternating-current voltage to the second permanent magnet synchronous motor; at least two disconnection contactors to switch between connection and disconnection of each of at least two of the three second power lines; at least two short-circuit contactors to switch between connection and disconnection between the two second power lines of each of at least two of pairs of the three second power lines; and a controller to control the at least two disconnection contactors and the at least two short-circuit contactors.

According to an aspect of the present invention, in a motor driving device that drives a first permanent magnet synchronous motor and a second permanent magnet synchronous motor with a single inverter, by providing disconnection contactors to disconnect between the second permanent magnet synchronous motor and the inverter and short-circuit contactors to short-circuit the second permanent magnet synchronous motor, and connecting the second permanent magnet synchronous motor to the inverter and driving the second permanent magnet synchronous motor after short-circuiting the second permanent magnet synchronous motor, it is possible to prevent occurrence of counter electromotive voltage from the second permanent magnet synchronous motor and demagnetization of a permanent magnet of the second permanent magnet synchronous motor.

DETAILED DESCRIPTION

First Embodiment

Figure 1:
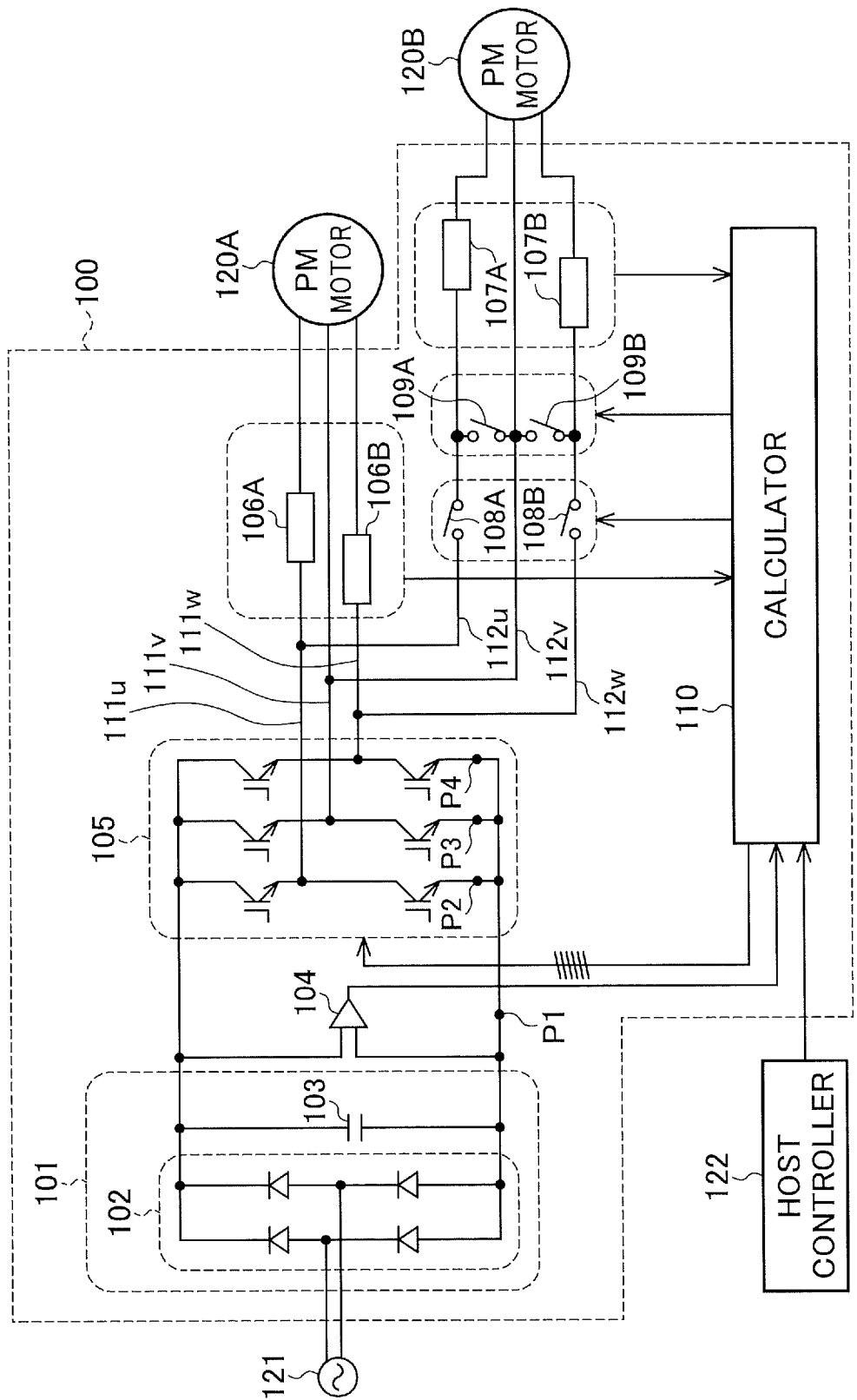
FIG. 1 is a schematic diagram illustrating a configuration of a motor driving device according to a first embodiment and its peripheral circuitry.

FIG. 1 is a schematic diagram illustrating a configuration of a motor driving device 100 according to a first embodiment and its peripheral circuitry.

The motor driving device 100 is connected to an alternating-current (AC) power supply 121, a first PM motor 120A, and a second PM motor 120B, and includes at least a converter 101, an inverter 105, disconnection contactors 108A and 108B, short-circuit contactors 109A and 109B, and a calculator 110.

The motor driving device 100 also includes a bus voltage sensor 104, first current sensors 106A and 106B, and second current sensors 107A and 107B.

With the above configuration, the motor driving device 100 drives the first PM motor 120A and second PM motor 120B.

The converter 101 generates a direct-current (DC) voltage. For example, the converter 101 converts an AC voltage from the AC power supply 121 to a DC voltage by rectifying the AC voltage with a rectifier 102 and then smoothing it with a smoothing unit 103, such as a capacitor. The DC voltage resulting from the conversion by the converter 101 is output to the inverter 105.

The bus voltage sensor 104 detects a DC bus voltage applied to the inverter 105. A bus voltage value that is a voltage value of the detected DC bus voltage is supplied to the calculator 110.

The inverter 105 generates a three-phase AC voltage from the DC voltage supplied from the converter 101, and outputs the three-phase AC voltage to the first PM motor 120A and second PM motor 120B. The first PM motor 120A and second PM motor 120B are connected in parallel to the output of the inverter 105. For example, the first PM motor 120A is connected to the inverter 105 through a first U-phase power line 111u, a first V-phase power line 111v, and a first W-phase power line 111w, and the second PM motor 120B is connected to the inverter 105 through a second U-phase power line 112u branched from the first U-phase power line 111u, a second V-phase power line 112v branched from the first V-phase power line 111v, and a second W-phase power line 112w branched from the first W-phase power line 111w.

Here, each of the first U-phase power line 111u, first V-phase power line 111v, and first W-phase power line 111w is a first power line for supplying the three-phase AC voltage to the first PM motor 120A.

Also, each of the second U-phase power line 112u, second V-phase power line 112v, and second W-phase power line 112w is a second power line for supplying the three-phase AC voltage to the second PM motor 120B.

The first current sensors 106A and 106B detect currents flowing through the first PM motor 120A. First current values that are the detected current values are supplied to the calculator 110. For example, the first current sensors 106A and 106B are each a sensor that detects a current using a Hall element.

Here, the first current sensor 106A detects the current flowing through the first U-phase power line 111u, and the first current sensor 106B detects the current flowing through the first W-phase power line 111w. However, the first embodiment is not limited to such an example. In the first embodiment, it is sufficient that the currents flowing through at least two first power lines of the first U-phase power line 111u, first V-phase power line 111v, and first W-phase power line 111w be detected, and all the currents flowing through the first power lines may be detected.

When the first current sensors 106A and 106B need not be particularly distinguished from each other, they will be referred to as first current sensors 106.

The second current sensors 107A and 107B detect currents flowing through the second PM motor 120B. Second current values that are the detected current values are supplied to the calculator 110. For example, the second current sensors 107A and 107B are each a sensor that detects a current using a Hall element.

Here, the second current sensor 107A detects the current flowing through the second U-phase power line 112u, and the second current sensor 107B detects the current flowing through the second W-phase power line 112w. However, the first embodiment is not limited to such an example. In the first embodiment, it is sufficient that the currents flowing through at least two second power lines of the second U-phase power line 112u, second V-phase power line 112v, and second W-phase power line 112w be detected, and all the currents flowing through the second power lines may be detected.

When the second current sensors 107A and 107B need not be particularly distinguished from each other, they are referred to as second current sensors 107.

The disconnection contactors 108A and 108B and the short-circuit contactors 109A and 109B are inserted between the inverter 105 and the second PM motor 120B.

The disconnection contactors 108A and 108B are inserted in series in at least two of the second power lines between the inverter 105 and the second PM motor 120B. Each of the disconnection contactors 108A and 108B switches between connection and disconnection of the second power line. Energization of the second PM motor 120B is controlled by operation of the disconnection contactors 108A and 108B.

For example, when the disconnection contactors 108A and 108B are turned on, the inverter 105 is connected to the second PM motor 120B, and power from the inverter 105 is supplied to the second PM motor 120B. On the other hand, when the disconnection contactors 108A and 108B are turned off, the inverter 105 is disconnected from the second PM motor 120B, and no power is supplied from the inverter 105 to the second PM motor 120B.

The disconnection contactors 108A and 108B operate in the same manner in accordance with commands from the calculator 110. Thus, when the disconnection contactors 108A and 108B need not be particularly distinguished from each other, they will be referred to below as disconnection contactors 108.

Here, the disconnection contactor 108A is inserted in the second U-phase power line 112u, and the disconnection contactor 108B is inserted in the second W-phase power line 112w. However, the first embodiment is not limited to such an example. It is sufficient that disconnection contactors 108 be inserted in at least two second power lines of the second U-phase power line 112u, second V-phase power line 112v, and second W-phase power line 112w, and it is possible that disconnection contactors 108 are inserted in all the power lines 112u, 112v, and 112w.

The short-circuit contactors 109A and 109B are inserted between the disconnection contactors 108 and the second PM motor 120B. Each of the short-circuit contactors 109A and 109B is inserted between the two second power lines included in one of the pairs of the second U-phase power line 112u, second V-phase power line 112v, and second W-phase power line 112w. Each of the short-circuit contactors 109A and 109B switches between connection and disconnection between the two second power lines. The presence or absence of short circuit of the second power lines connected to the second PM motor 120B can be controlled by operation of the short-circuit contactors 109A and 109B.

For example, when the short-circuit contactors 109A and 109B are turned on, the second U-phase power line 112u and second V-phase power line 112v are connected to each other, and the second V-phase power line 112v and second W-phase power line 112w are connected to each other, so that the paths of the currents flowing through the second PM motor 120B are closed in the second PM motor 120B. Thereby, no power is supplied from the inverter 105 to the second PM motor 120B, power supplied to the second PM motor 120B is consumed by the second PM motor 120B itself, and the second PM motor 120B can be braked. Thus, even when the second PM motor 120B is in a free-running state, the second PM motor 120B is braked and stops rotating, so that the counter electromotive voltage can be reduced.

On the other hand, when the short-circuit contactors 109A and 109B are turned off, the second U-phase power line 112u and second V-phase power line 112v are disconnected from each other, the second V-phase power line 112v and second W-phase power line 112w are disconnected from each other, the current paths are formed between the inverter 105 and the second PM motor 120B, and power is supplied from the inverter 105 to the second PM motor 120B.

The short-circuit contactors 109A and 109B operate in the same manner in accordance with commands from the calculator 110. Thus, when the short-circuit contactors 109A and 109B need not be particularly distinguished from each other, they will be referred to below as short-circuit contactors 109.

Here, the short-circuit contactor 109A is inserted between the second U-phase power line 112u and the second V-phase power line 112v, and the short-circuit contactor 109B is inserted between the second V-phase power line 112v and the second W-phase power line 112w. However, the first embodiment is not limited to such an example. It is sufficient that a short-circuit contactor 109 be inserted between each of at least two of the pair of the second U-phase power line 112u and second V-phase power line 112v, the pair of the second V-phase power line 112v and second W-phase power line 112w, and the pair of the second U-phase power line 112u and second W-phase power line 112w, and it is possible that a short-circuit contactor 109 is inserted between each of all the pairs.

The calculator 110 is a controller that controls processes in the motor driving device 100.

For example, the calculator 110 performs motor control calculation and generates driving signals for respective switching elements of the inverter 105, on the basis of the detection results of the first current sensors 106, second current sensors 107, and bus voltage sensor 104. Here, the calculator 110 performs vector control. Specifically, the calculator 110 determines, from the detection results of the first current sensors 106, a current value flowing through each phase of the first PM motor 120A, and performs coordinate conversion from stationary three-phase coordinates to rotational two-phase coordinates, on the determined current values, thereby calculating first current values in dq-axes. Similarly, the calculator 110 determines, from the detection results of the second current sensors 107, a current value flowing through each phase of the second PM motor 120B, and performs coordinate conversion from stationary three-phase coordinates to rotational two-phase coordinates, on the determined current values, thereby calculating second current values in dq-axes. The calculator 110 generates the driving signals for the inverter 105 so that the first current values calculated as above are equal to ideal values, in consideration of the difference between the first current values and the second current values.

The above-described vector control is merely an example, and the calculator 110 may use any control method.

Also, the calculator 110 controls the disconnection contactors 108 and short-circuit contactors 109 in accordance with commands from a host controller 122.

For example, when stopping the second PM motor 120B, the calculator 110 switches the disconnection contactors 108 from connection to disconnection and switches the short-circuit contactors 109 from disconnection to connection.

Figures 2, 3:
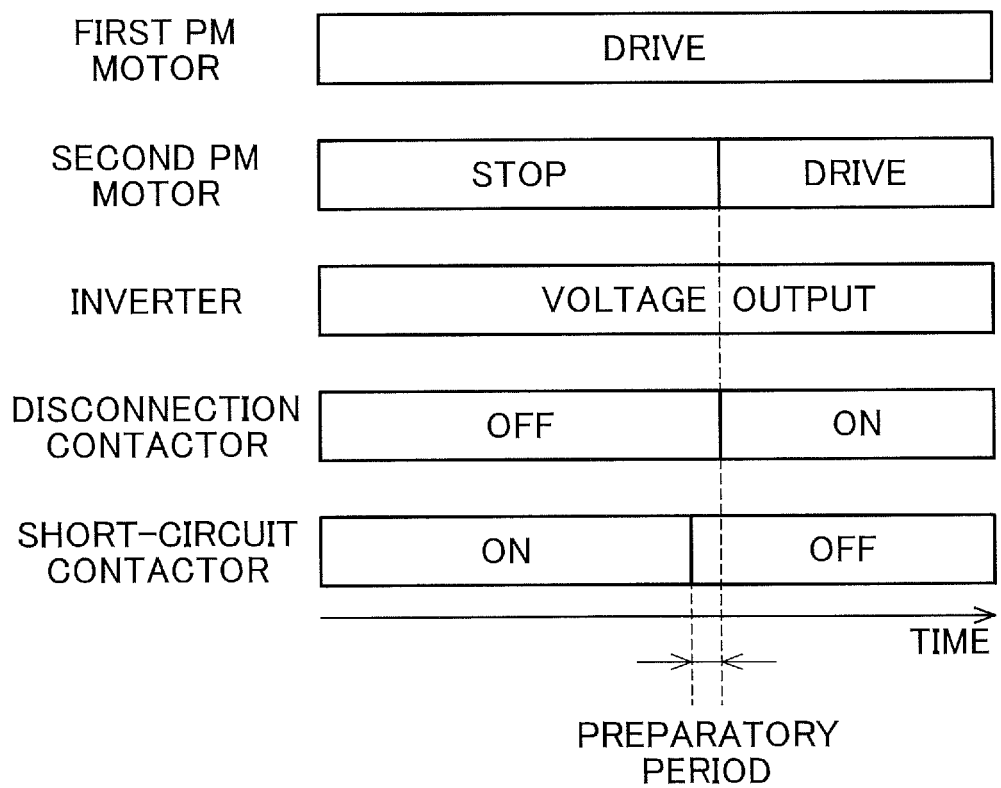
FIG. 2 is a table illustrating operational modes in which disconnection contactors and short-circuit contactors are controlled.
FIG. 3 is a schematic diagram illustrating a first example of an operating sequence of a first PM motor, a second PM motor, an inverter, the disconnection contactors, and the short-circuit contactors.

FIG. 2 is a table illustrating operation modes in which the disconnection contactors 108 and short-circuit contactors 109 are controlled in accordance with commands from the host controller 122.

As illustrated in FIG. 2, upon receiving a command to cause the second PM motor 120B to operate, i.e., a command to energize the second PM motor 120B, from the host controller 122, the calculator 110 turns the disconnection contactors 108 on, and turns the short-circuit contactors 109 off. On the other hand, upon receiving a command to stop the second PM motor 120B, i.e., a command to supply no current to the second PM motor 120B, from the host controller 122, the calculator 110 turns the disconnection contactors 108 off, and turns the short-circuit contactors 109 on. Here, "on" indicates that they are in conduction states, and "off" indicates that they are in open states.

The operation will now be described. FIG. 3 is a schematic diagram illustrating a first example of an operating sequence of the first PM motor 120A, second PM motor 120B, inverter 105, disconnection contactors 108, and short-circuit contactors 109. FIG. 3 illustrates a sequence in the case of driving the second PM motor 120B that has been stopped, in addition to the first PM motor 120A that is being driven.

As illustrated in FIG. 3, when the first PM motor 120A is being driven and the second PM motor 120B is stopped, the disconnection contactors 108 are turned off, and the power supply from the inverter 105 to the second PM motor 120B is disconnected. Meanwhile, the short-circuit contactors 109 are turned on, and the second PM motor 120B is in a short-circuit state.

Then, the short-circuit contactors 109 are turned off and the second PM motor 120B is switched from the short-circuit state to an open state, and then the disconnection contactors 108 are turned on, resulting in a state where power is supplied from the inverter 105 to the second PM motor 120B, and the current paths between the inverter 105 and the second PM motor 120B are connected. Thereby, power is supplied from the inverter 105 to the second PM motor 120B, and the second PM motor 120B is also driven.

Here, it is assumed that the disconnection contactors 108 and short-circuit contactors 109 are, for example, relays or semiconductor switching elements. Whichever is used, it takes time to turn on or off. A preparatory period is provided after the short-circuit contactors 109 are turned off and before the disconnection contactors 108 are turned on. This is because it takes time for the disconnection contactors 108 to switch between the on and off states, and is to prevent a situation in which the short-circuit contactors 109 turn off simultaneously with the disconnection contactors 108 turning on, or a situation in which the short-circuit contactors 109 are turned off after the disconnection contactors 108 are turned on.

If the short-circuit contactors 109 were turned off after turning on of the disconnection contactors 108, a state in which the disconnection contactors 108 and short-circuit contactors 109 are both turned on would occur, the outputs of the inverter 105 would be short-circuited, and upon operation of the inverter 105, the inverter 105 would be stopped or damaged due to overcurrent.

However, in the case of the switching sequence of FIG. 3, since the AC voltage is suddenly applied to the second PM motor 120B in a stopped state, inrush current flows at the time of the switching, which may demagnetize a magnet of a rotor of the second PM motor 120B. Due to the nature of the PM motor, when the rotational frequency of the rotor of the second PM motor 120B is greatly different from the frequency of the AC voltage output by the inverter 105, the output voltage of the inverter 105 fails to be synchronized with the rotor of the second PM motor 120B, which may lead to step-out.

Figure 4:
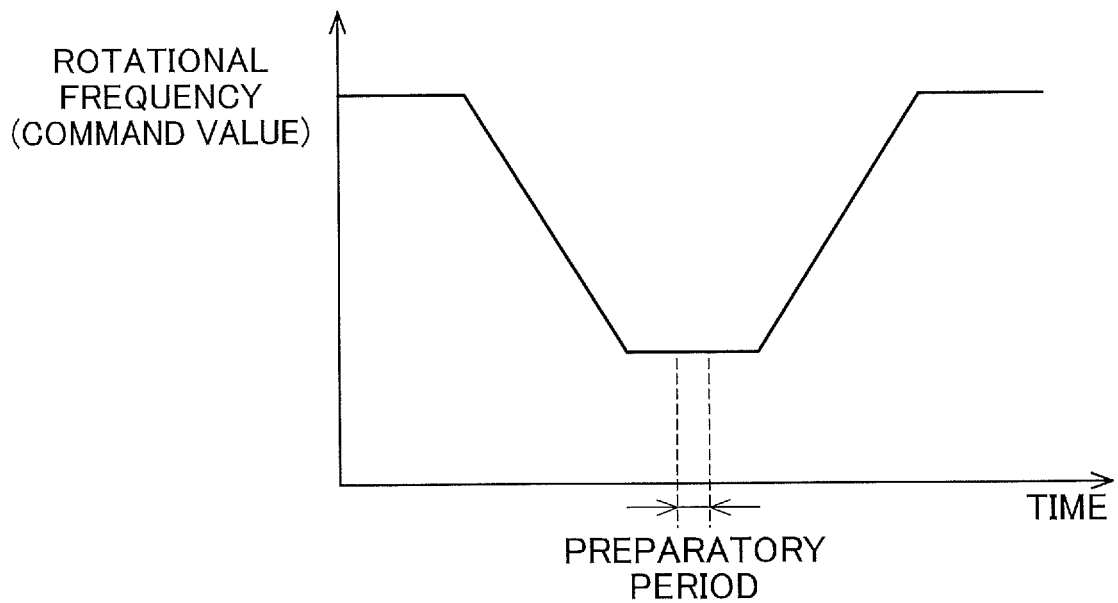
FIG. 4 is a schematic diagram illustrating a rotational frequency command value provided from the inverter to the first PM motor.

Thus, as illustrated in FIG. 4, before the short-circuit contactors 109 are turned off and the disconnection contactors 108 are turned on, a rotational frequency command value provided from the inverter 105 to the first PM motor 120A is decreased. While the amount of current flowing through the first PM motor 120A is small, the short-circuit contactors 109 are turned off and the disconnection contactors 108 are turned on, so that the current paths between the inverter 105 and the second PM motor 120B are connected. Then, the rotational frequency command value provided from the inverter 105 to the first PM motor 120A and second PM motor 120B is increased again.

Since the disconnection contactors 108 are turned on while the amount of current flowing through the first PM motor 120A is small, the second PM motor 120B easily follows the first PM motor 120A, and the step-out can be prevented.

In the operating sequence illustrated in FIG. 3, while the first PM motor 120A is being driven and the second PM motor 120B is stopped, the short-circuit contactors 109 are turned on. However, since the disconnection contactors 108 are turned off and the power supply from the inverter 105 to the second PM motor 120B is disconnected, the short-circuit contactors 109 may be turned off.

Also, the rotational frequency of the first PM motor 120A is decreased, the frequency of the AC voltage output by the inverter 105 is also decreased, and the difference between the rotational frequency of the second PM motor 120B in the stopped state and the frequency of the AC voltage output by the inverter 105 is decreased. This facilitates synchronous pull-in of the rotor of the second PM motor 120B, and can prevent step-out of the second PM motor 120B.

Figure 5:
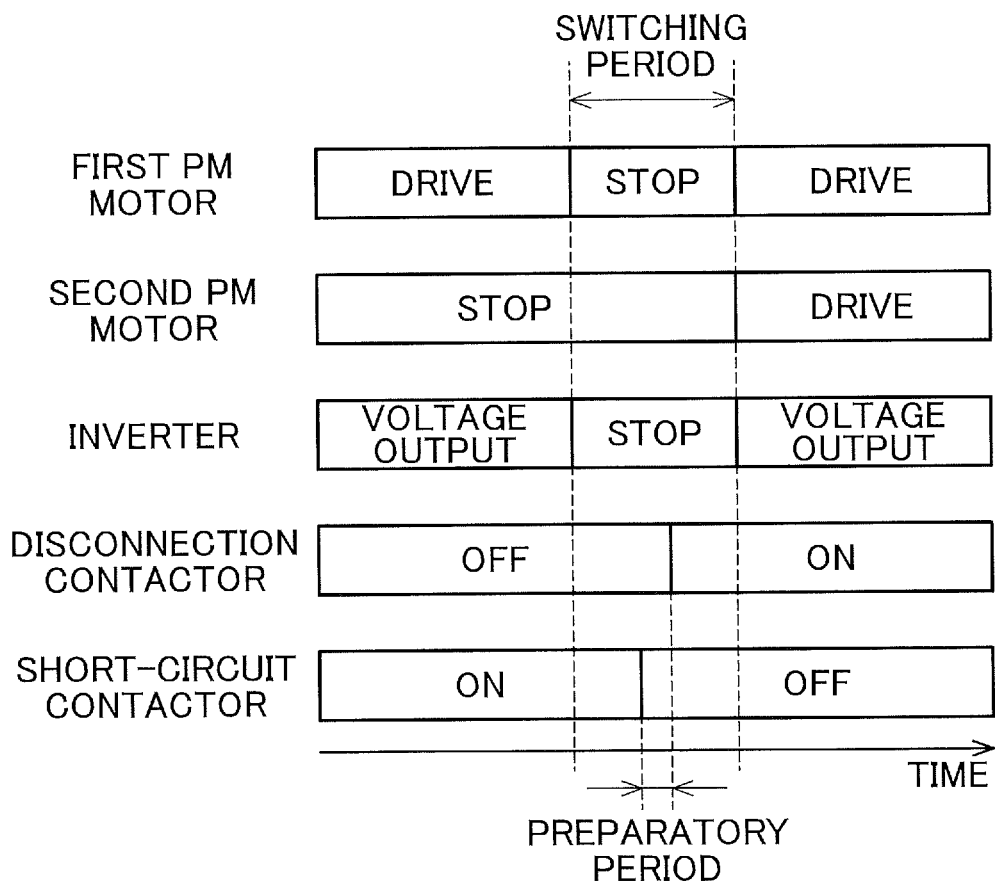
FIG. 5 is a schematic diagram illustrating a second example of an operating sequence of the first PM motor, second PM motor, inverter, disconnection contactors, and short-circuit contactors.

The following describes, with reference to FIG. 5, an operation of preventing step-out of the second PM motor 120B in a simpler way without performing control of the rotational frequency command value. In FIG. 5, the operation when only the first PM motor 120A is being driven and the second PM motor 120B is stopped is the same as that in FIG. 3, and the subsequent operation differs from the operating sequence illustrated in FIG. 3.

As illustrated in FIG. 5, when the first PM motor 120A is being driven and the second PM motor 120B is stopped, a voltage is output from the inverter 105, the disconnection contactors 108 are turned off, and the short-circuit contactors 109 are turned on.

Then, the output of voltage from the inverter 105 is stopped, and the driving of the first PM motor 120A is stopped. In a switching period during which the first PM motor 120A and second PM motor 120B are stopped, the short-circuit contactors 109 are turned off and the second PM motor 120B is switched from the short-circuit state to the open state, and then the disconnection contactors 108 are turned on and the current paths between the inverter 105 and the second PM motor 120B are connected. Then, the voltage from the inverter 105 is output, and the first PM motor 120A and second PM motor 120B connected to the inverter 105 are driven.

As described above, the current paths between the inverter 105 and the second PM motor 120B are connected while the first PM motor 120A and second PM motor 120B are stopped. This prevents a large voltage from being suddenly applied to the second PM motor 120B after the second PM motor 120B is driven, and can prevent step-out of the second PM motor 120B.

The following describes an operation of stopping the second PM motor 120B that is being driven.

Figure 6:
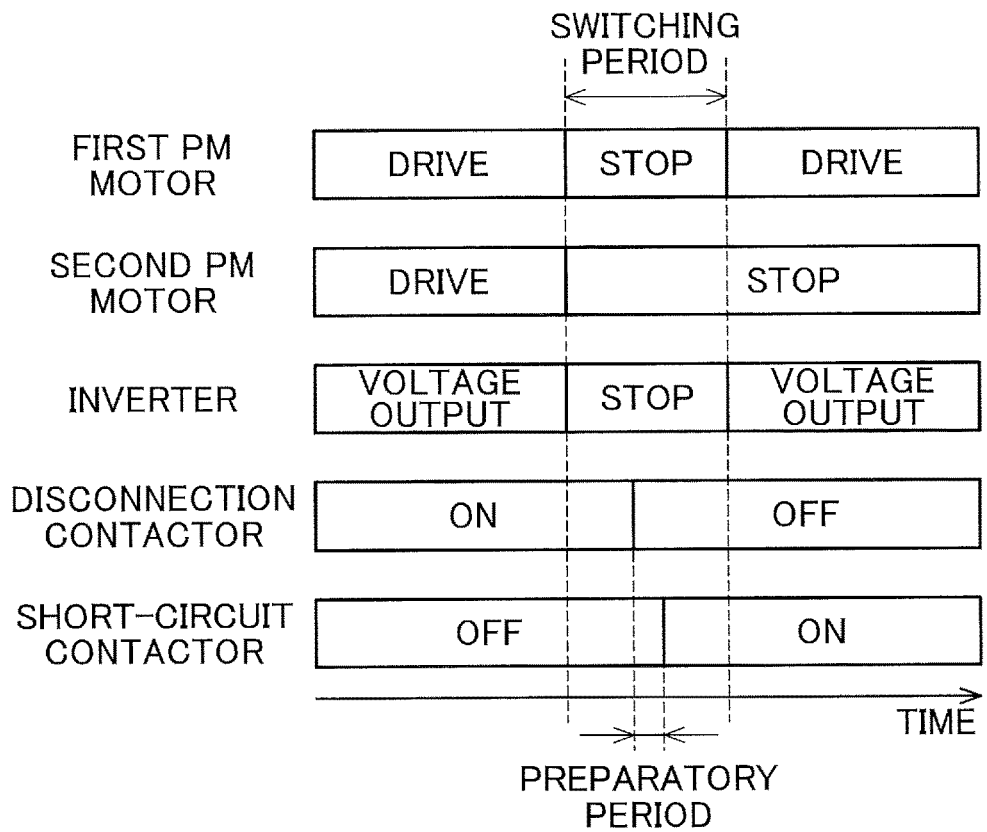
FIG. 6 is a schematic diagram illustrating a third example of an operating sequence of the first PM motor, second PM motor, inverter, disconnection contactors, and short-circuit contactors.

FIG. 6 is a schematic diagram illustrating a third example of an operating sequence of the first PM motor 120A, second PM motor 120B, inverter 105, disconnection contactors 108, and short-circuit contactors 109.

FIG. 6 illustrates a sequence in the case of stopping the second PM motor 120B that is being driven.

As illustrated in FIG. 2, when the second PM motor 120B is driven, the disconnection contactors 108 are turned on, and when it is stopped, the short-circuit contactors 109 are turned on to prevent free running.

Here, it is assumed that the disconnection contactors 108 and short-circuit contactors 109 are, for example, relays or semiconductor switching elements. Whichever contactor is used, it takes time to turn on or off. The short-circuit contactors 109 are inserted to short-circuit the phases. Thus, as illustrated in FIG. 6, the voltage output of the inverter 105 is stopped once, and then the state of the short-circuit contactors 109 is switched. Thus, as illustrated in FIG. 6, a switching period during which the inverter 105 is stopped is provided.

Since it also takes time for the state of the disconnection contactors 108 to switch, a preparatory period is provided after the disconnection contactors 108 are turned off and before the short-circuit contactors 109 are turned on.

Figure 7:
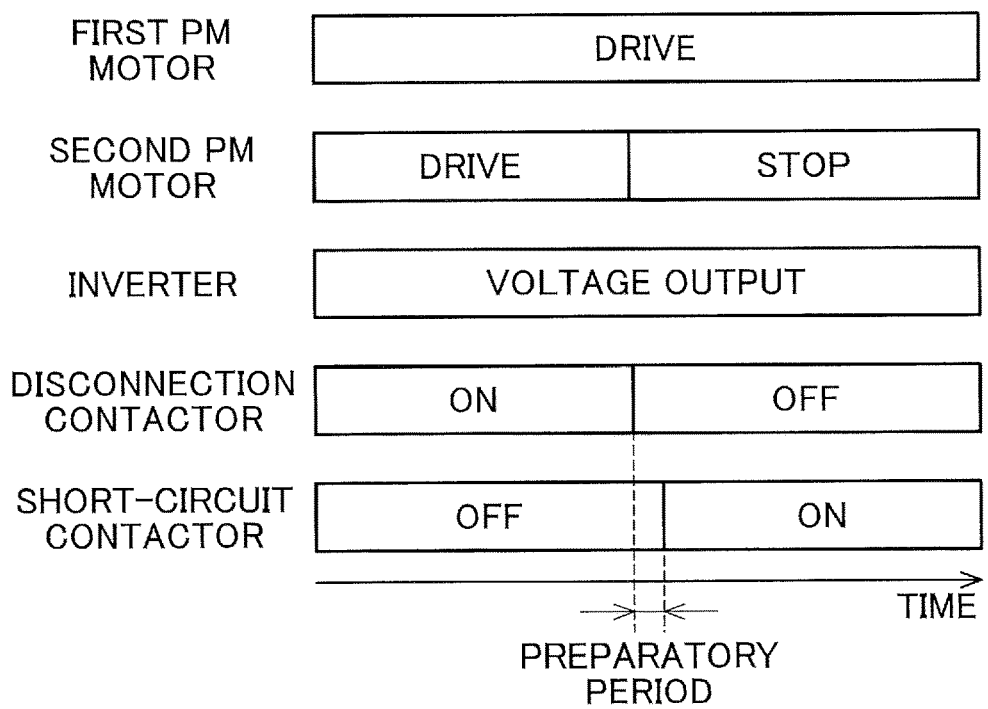
FIG. 7 is a schematic diagram illustrating a fourth example of an operating sequence of the first PM motor, second PM motor, inverter, disconnection contactors, and short-circuit contactors.

FIG. 7 is a schematic diagram illustrating a fourth example of an operating sequence of the first PM motor 120A, second PM motor 120B, inverter 105, disconnection contactors 108, and short-circuit contactors 109.

As described above, the disconnection contactors 108 are inserted in series with respect to the inverter 105 and second PM motor 120B. Thus, when the disconnection contactors 108 are turned off, no voltage is applied from the inverter 105 to the second PM motor 120B. Thus, by turning the disconnection contactors 108 off while the voltage is being output by the inverter 105, and turning the short-circuit contactors 109 on after the disconnection contactors 108 are turned off, it is possible to stop the second PM motor 120B without stopping the inverter 105 and first PM motor 120A.

In this case, it is not necessary to provide the switching period as illustrated in FIG. 6. However, since it takes time for the state of the disconnection contactors 108 to switch, a preparatory period is provided after the disconnection contactors 108 are turned off and before the short-circuit contactors 109 are turned on.

Figure 8A:
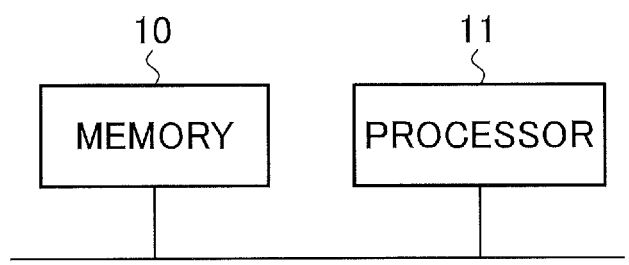
FIGS. 8A and 8B are schematic diagrams illustrating hardware configuration examples.

Part or the whole of the calculator 110 and host controller 122 described above can be formed by, for example, a memory 10 and a processor 11, such as a central processing unit (CPU), that executes a program stored in the memory 10, as illustrated in FIG. 8A. Such a program may be provided via a network, or may be recorded and provided in a recording medium. Such a program may be provided as a program product, for example.

In this case, part or the whole of the calculator 110 and host controller 122 may be implemented by a single processor 11, or may be implemented by different processors 11.

Figure 8B:
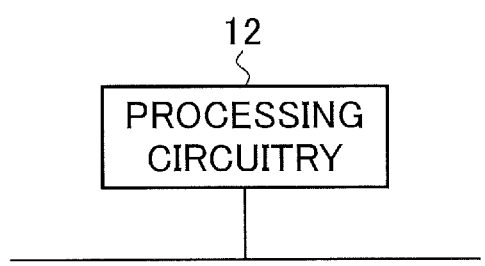

Also, part of the calculator 110 and host controller 122 may be formed by processing circuitry 12, such as a single circuit, a composite circuit, a programmed processor, a parallel-programmed processor, application specific integrated circuits (ASICs), or a field programmable gate array (FPGA), as illustrated in FIG. 8B, for example.

Second Embodiment

In the case of the motor driving device 100 according to the first embodiment, it is conceivable that when the disconnection contactors 108 are turned off and the short-circuit contactors 109 are turned on, an increase in the rotational frequency of the second PM motor 120B due to free running increases the motor current, thereby causing problems, such as demagnetization. Thus, the second embodiment addresses such problems.

Figure 9:
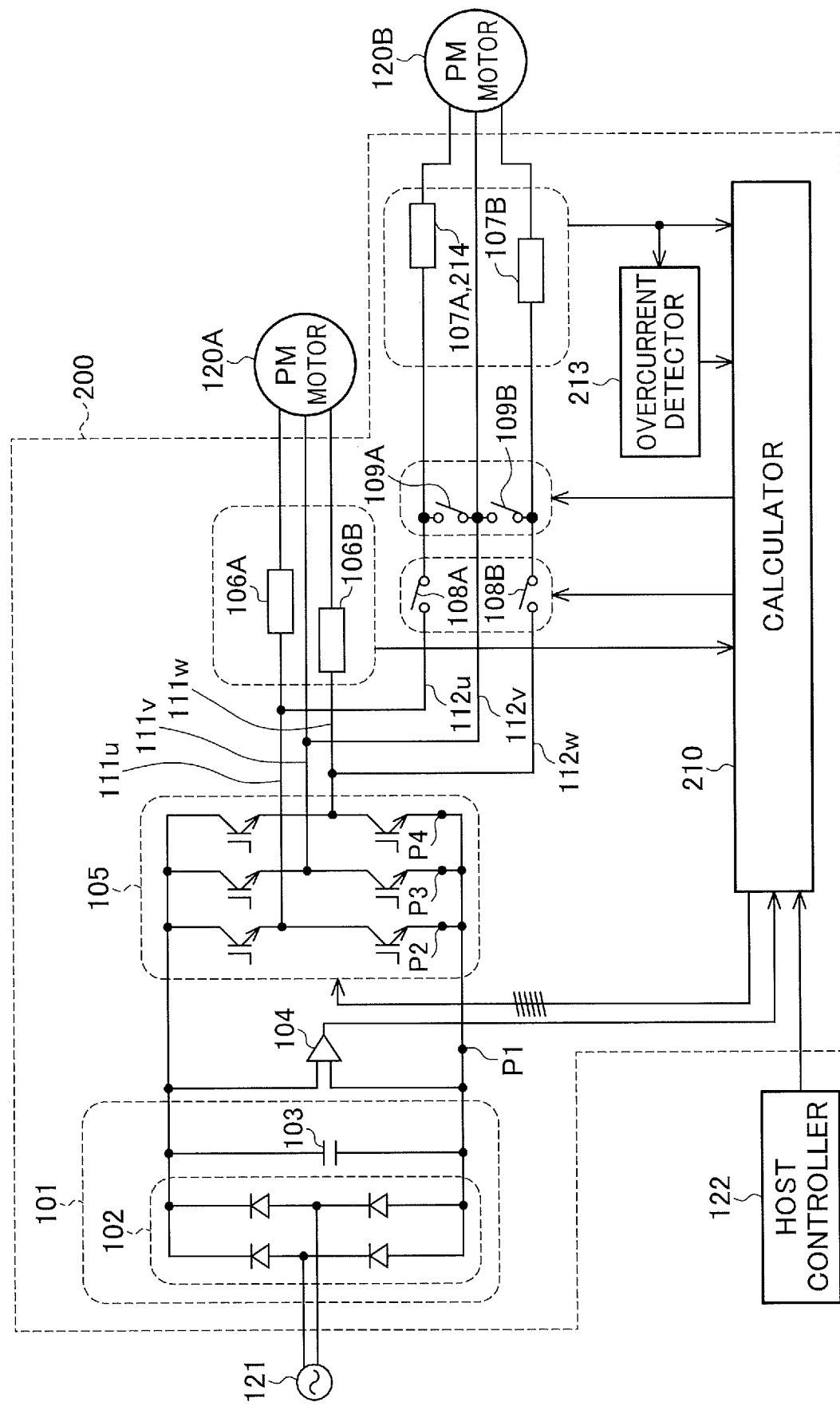
FIG. 9 is a schematic diagram illustrating a configuration of a motor driving device according to a second embodiment and its peripheral circuitry.

FIG. 9 is a schematic diagram illustrating a configuration of a motor driving device 200 according to a second embodiment and its peripheral circuitry.

The motor driving device 200 includes at least a converter 101, an inverter 105, disconnection contactors 108, short-circuit contactors 109, and a calculator 210.

The motor driving device 200 also includes a bus voltage sensor 104, first current sensors 106, second current sensors 107, and an overcurrent detector 213.

With the above configuration, the motor driving device 200 drives a first PM motor 120A and a second PM motor 120B.

The converter 101, inverter 105, disconnection contactors 108, short-circuit contactors 109, bus voltage sensor 104, first current sensors 106, and second current sensors 107 of the second embodiment are the same as those of the first embodiment.

However, at least one of the second current sensors 107A and 107B is used as a brake current sensor that detects a current flowing through the second PM motor 120B when the short-circuit contactors 109 are turned on. Here, it is assumed that the second current sensor 107A is used as the brake current sensor, and the second current sensor 107A will also be referred to as the brake current sensor 214. Also, the current value detected by the brake current sensor 214 when the short-circuit contactors 109 are turned on will be referred to as the brake current value.

The brake current value detected by the brake current sensor 214 is provided to the overcurrent detector 213.

When the short-circuit contactors 109 are turned on, the overcurrent detector 213 determines, on the basis of the brake current value, whether a brake current that is the current flowing through the second PM motor 120B is an overcurrent. For example, when the brake current value is greater than an overcurrent determination value that is a predetermined threshold, the overcurrent detector 213 detects that the brake current is an overcurrent. On the other hand, when the brake current value is not greater than the overcurrent determination value, the overcurrent detector 213 detects that the brake current is not an overcurrent.

Then, according to the result of the above detection, the overcurrent detector 213 provides the calculator 210 with an overcurrent detection signal indicating whether the brake current is an overcurrent, thereby informing the calculator 210 of whether the brake current is an overcurrent.

The calculator 210 is a controller that controls processes in the motor driving device 200.

The calculator 210 performs the same processing as the calculator 110 of the first embodiment. In addition, after the short-circuit contactors 109 are turned on, when the calculator 210 receives, from the overcurrent detector 213, an overcurrent detection signal indicating that the brake current is an overcurrent, the calculator 210 switches the short-circuit contactors 109 from connection to disconnection.

Figure 10:
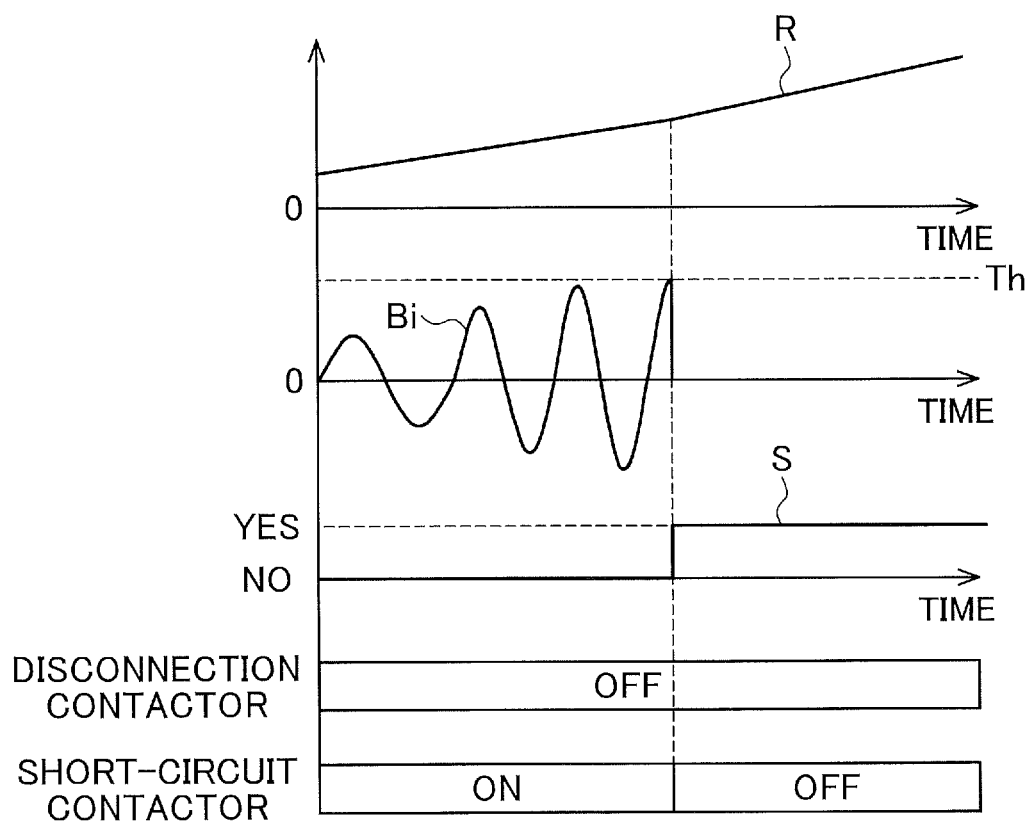
FIG. 10 is a schematic diagram illustrating a relationship between a brake current and an overcurrent detection signal.

FIG. 10 is a schematic diagram illustrating a relationship between the brake current and the overcurrent detection signal.

FIG. 10 is merely a schematic diagram illustrating an operation example, and illustrates waveforms and the like in a simple manner.

FIG. 10 illustrates an operation in a case where, when the disconnection contactors 108 are turned off and the short-circuit contactors 109 are turned on, the brake current value, which is the current value of the current flowing through the second PM motor 120B, gradually increases. As described in the first embodiment, the state where the disconnection contactors 108 are turned off and the short-circuit contactors 109 are turned on is a state where no power is supplied from the inverter 105 to the second PM motor 120B and brake current is allowed to flow to prevent free-running rotation of the second PM motor 120B. Thus, as illustrated in FIG. 10, it is a state where the rotational frequency R of the second PM motor 120B is not zero and thus brake current is flowing through the second PM motor 120B.

When the rotational frequency R of free running of the second PM motor 120B gradually increases due to increase of outside wind or other reasons, the counter electromotive voltage of the second PM motor 120B increases, and thus the brake current value Bi also increases.

When the brake current value Bi exceeds the overcurrent determination value Th, an overcurrent determination signal S changes from a state where it indicates No to a state where it indicates Yes. Here, when the overcurrent determination signal S is in the state where it indicates No, it indicates that the brake current is not an overcurrent, and when the overcurrent determination signal S is in the state where it indicates Yes, it indicates that the brake current is an overcurrent.

When the overcurrent determination signal S enters the state where it indicates Yes, the short-circuit contactors 109 are turned off. This brings the second PM motor 120B out of the short-circuit state, and places the terminals of the second PM motor 120B in open states, so that the brake current value Bi becomes zero.

As described above, the disconnection contactors 108 are left turned off.

Thus, in the braking state for reducing free-running rotation of the second PM motor 120B, when the brake current is increased, it is possible to prevent demagnetization of the second PM motor 120B and improve the reliability of the device.

An arrangement relationship of the short-circuit contactors 109, brake current sensor 214, and second PM motor 120B will now be described.

As described above, the overcurrent detector 213 performs the overcurrent determination on the basis of the value detected by the brake current sensor 214. Thus, the brake current sensor 214 is disposed between the short-circuit contactors 109 and the second PM motor 120B.

Part or the whole of the overcurrent detector 213 can be formed by the memory 10 and processor 11 as illustrated in FIG. 8A, for example. In this case, the overcurrent detector 213 may be implemented by a processor 11 that implements the calculator 210, or may be implemented by another processor 11.

Also, part of the overcurrent detector 213 can be formed by a processing circuitry 12 as illustrated in FIG. 8B, for example.

In FIG. 9, the overcurrent detector 213 is provided. However, instead of providing the overcurrent detector 213, the calculator 210 may perform the overcurrent determination performed by the overcurrent detector 213.

Third Embodiment

Here, an air conditioner in which the motor driving device 100 or 200 according to the first or second embodiment is installed will be described.

Figure 11:
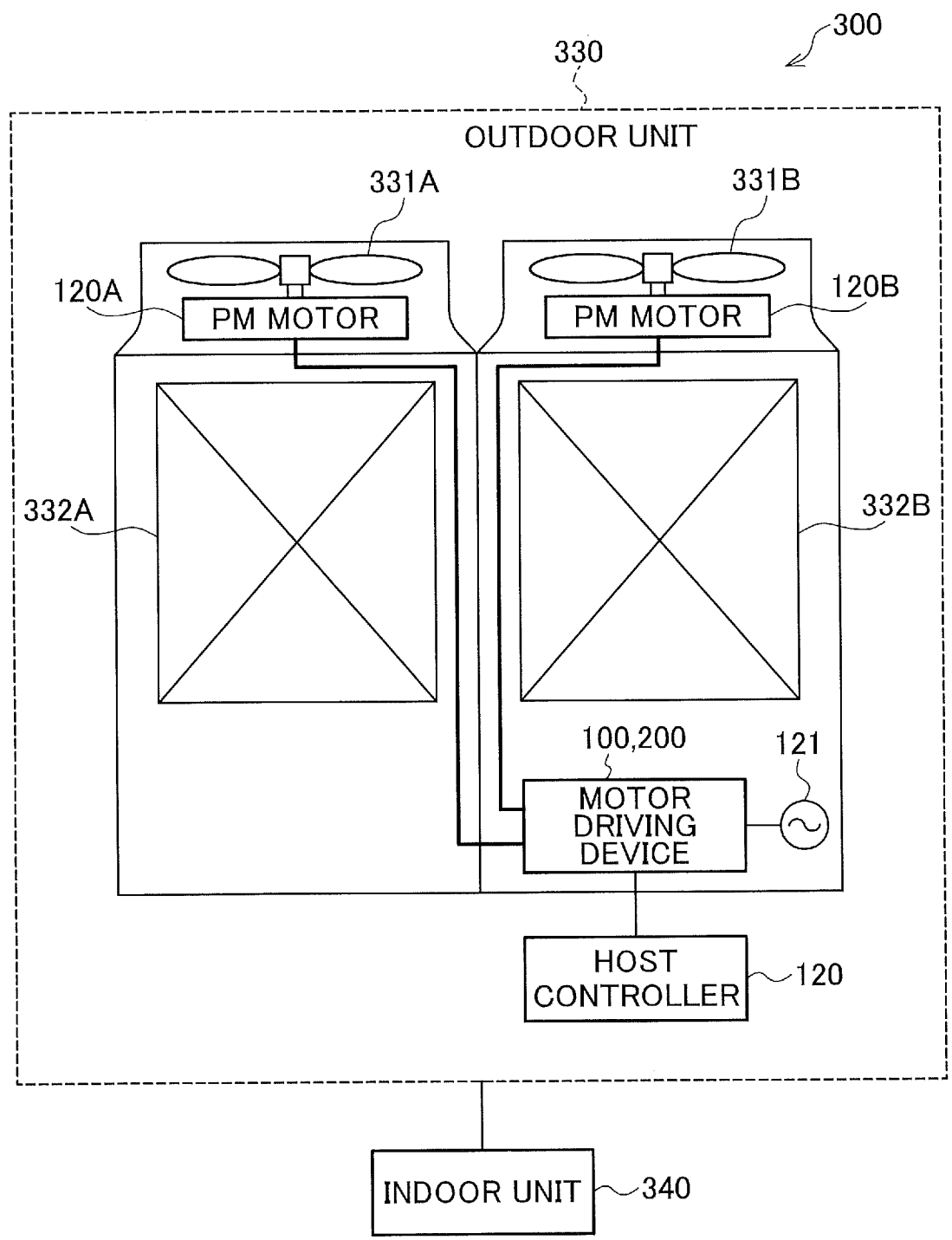
FIG. 11 is a block diagram schematically illustrating a configuration of an air conditioner according to a third embodiment.

FIG. 11 is a block diagram schematically illustrating a configuration of an air conditioner 300 according to a third embodiment.

The air conditioner 300 includes an outdoor unit 330 and an indoor unit 340.

The outdoor unit 330 is installed outdoors, the indoor unit 340 is installed indoors, and they condition indoor air.

Here, the description of the detailed configuration and operation principle of the air conditioner 300 will be omitted.

The outdoor unit 330 includes a motor driving device 100 or 200, a first PM motor 120A, a second PM motor 120B, an AC power supply 121, a host controller 122, a first fan 331A, a second fan 331B, a first heat exchanger 332A, and a second heat exchanger 332B.

The motor driving device 100 or 200 of the third embodiment is the same as that of the first or second embodiment.

The first PM motor 120A and second PM motor 120B of the third embodiment are the same as those of the first embodiment. The first PM motor 120A is connected to the first fan 331A and used to rotate the first fan 331A. The second PM motor 120B is connected to the second fan 331B and used to rotate the second fan 331B.

The AC power supply 121 and host controller 122 of the third embodiment are the same as those of the first embodiment.

The first fan 331A is used to vent air heated or cooled by the first heat exchanger 332A.

The second fan 331B is used to vent air heated or cooled by the second heat exchanger 332B.

The first heat exchanger 332A exchanges heat of refrigerant.

The second heat exchanger 332B exchanges heat of refrigerant.

In the case of a large air conditioner, the path through which refrigerant flows in a refrigeration cycle may be switched depending on the required air conditioning capacity. For example, in the air conditioner 300, when the required air conditioning capacity is low, heat exchange is performed while refrigerant is flowed through only the first heat exchanger 332A. In this case, since heat exchange is not performed by the second heat exchanger 332B, the second PM motor 120B need not be driven. In this case, the disconnection contactors 108 are turned off, and power is supplied from the inverter 105 to only the first PM motor 120A.

In this case, since the terminals of the second PM motor 120B are in open states, when outside wind blows, the second PM motor 120B enters a free-running state. The free-running rotation is reduced by turning the short-circuit contactors 109 on, as described in the first or second embodiment.

On the other hand, when the required air conditioning capacity is high, refrigerant is flowed through both the first heat exchanger 332A and second heat exchanger 332B. In this case, both the first PM motor 120A and second PM motor 120B need to be driven. At this time, the disconnection contactors 108 are turned on, and the short-circuit contactors 109 are turned off, thereby allowing the two fans 331A and 331B to be rotated.

As described above, the driving of the multiple PM motors 120A and 120B can be switched depending on the operating condition of the air conditioner 300, by the motor driving device 100 or 200 described in the first or second embodiment.

Although the outdoor unit 330 illustrated in FIG. 11 is of a top-flow type, the outdoor unit 330 may be of a side-flow type.

In the above-described first to third embodiments, at least two disconnection contactors may be inserted in series in at least two power lines of the first U-phase power line 111u, first V-phase power line 111v, and first W-phase power line 111w between the first PM motor 120A and the positions where the second U-phase power line 112u, second V-phase power line 112v, and second W-phase power line 112w are branched. Also, at least two short-circuit contactors may be inserted between the first PM motor 120A and the disconnection contactors inserted in the at least two power lines of the first U-phase power line 111u, first V-phase power line 111v, and first W-phase power line 111w so that they connect or disconnect between the second U-phase power line 112u, second V-phase power line 112v, and second W-phase power line 112w.

In such a case, in the second embodiment, a brake current sensor is provided also in the first U-phase power line 111u, first V-phase power line 111v, or first W-phase power line 111w.

In the above-described first to third embodiments, the current values of the respective phases of the first PM motor 120A and second PM motor 120B are detected by the first current sensors 106 and second current sensors 107. However, the first to third embodiments are not limited to such an example. For example, it is also possible that shunt resistor(s) (not illustrated) are disposed at position(s), such as point P1 or points P2-P4 in FIG. 1, and the calculator 110 or 210 calculates the current values from the terminal voltage(s). In such a case, one of the set of the first current sensors 106 and the set of the second current sensors 107 may be removed. However, in the second embodiment, at least one brake current sensor 214 is required.

As described above, in the first to third embodiments, the disconnection contactors 108 and short-circuit contactors 109 are provided. Thereby, it is possible to prevent free running of the second PM motor 120B.

The short-circuit contactors 109 are provided between the disconnection contactors 108 and the second PM motor 120B. Thereby, it is possible to prevent overcurrent from flowing through the inverter 105 when the short-circuit contactors 109 are turned on.

When the driving of the second PM motor 120B is stopped, the disconnection contactors 108 are switched from connection to disconnection, and the short-circuit contactors 109 are switched from disconnection to connection. Thereby, even when the inverter 105 is operating, it is possible to stop the second PM motor 120B and prevent free running of the second PM motor 120B that is stopped.

When the driving of the second PM motor 120B is stopped, the disconnection contactors 108 are switched from connection to disconnection, and then the short-circuit contactors 109 are switched from disconnection to connection. Thereby, it is possible to prevent overcurrent in the inverter.

In the second embodiment, when the brake current value detected by the brake current sensor 214 is greater than the predetermined threshold, the calculator 210 switches the short-circuit contactors 109 from connection to disconnection. Thereby, it is possible to prevent problems, such as demagnetization in the second PM motor 120B.

The brake current sensor 214 is provided between the short-circuit contactors 109 and the second PM motor 120B, and thus can accurately detect a current flowing through the second PM motor 120B.

In the third embodiment, the first PM motor 120A is used to rotate the first fan 331A, and the second PM motor 120B is used to rotate the second fan 331B. Thus, it is possible to prevent the second PM motor 120B from free running due to outside wind or the like.

The invention claimed is:

1. A motor driving device for driving a first permanent magnet synchronous motor and a second permanent magnet synchronous motor, the motor driving device comprising:
a converter to generate a direct-current voltage;
an inverter to generate a three-phase alternating-current voltage from the direct-current voltage;
three first power lines to supply the three-phase alternating-current voltage to the first permanent magnet synchronous motor;
three second power lines to supply the three-phase alternating-current voltage to the second permanent magnet synchronous motor;
at least two disconnection contactors to switch between connection and disconnection of each of at least two of the three second power lines;
at least two short-circuit contactors to switch between connection and disconnection between the two second power lines of each of at least two of pairs of the three second power lines; and
a controller to control the at least two disconnection contactors and the at least two short-circuit contactors.

2. The motor driving device of claim 1, wherein the at least two short-circuit contactors are provided between the at least two disconnection contactors and the second permanent magnet synchronous motor.

3. The motor driving device of claim 1, wherein when stopping driving of the second permanent magnet synchronous motor, the controller switches the at least two disconnection contactors from the connection to the disconnection and switches the at least two short-circuit contactors from the disconnection to the connection.

4. The motor driving device of claim 3, wherein when stopping driving of the second permanent magnet synchronous motor, the controller switches the at least two disconnection contactors from the connection to the disconnection, and then switches the at least two short-circuit contactors from the disconnection to the connection.

5. The motor driving device of claim 3, further comprising:
a current sensor to detect a current value of a current flowing through the second permanent magnet synchronous motor; and
an overcurrent detector to determine whether the current value is greater than a predetermined threshold,
wherein after the controller switches the at least two short-circuit contactors from the disconnection to the connection, when the overcurrent detector determines that the current value is greater than the predetermined threshold, the controller switches the at least two short-circuit contactors from the connection to the disconnection.

6. The motor driving device of claim 3, further comprising a current sensor to detect a current value of a current flowing through the second permanent magnet synchronous motor,
wherein after switching the at least two short-circuit contactors from the disconnection to the connection, the controller determines whether the current value is greater than a predetermined threshold, and when the current value is greater than the predetermined threshold, switches the at least two short-circuit contactors from the connection to the disconnection.

7. The motor driving device of claim 6, wherein the current sensor is provided between the at least two short-circuit contactors and the second permanent magnet synchronous motor.

8. The motor driving device of claim 1, wherein
the first permanent magnet synchronous motor is used to rotate a first fan, and
the second permanent magnet synchronous motor is used to rotate a second fan.

9. An air conditioner comprising:
a first permanent magnet synchronous motor;
a second permanent magnet synchronous motor; and
a motor driving device to drive the first permanent magnet synchronous motor and the second permanent magnet synchronous motor,
wherein the motor driving device includes:
a converter to generate a direct-current voltage;
an inverter to generate a three-phase alternating-current voltage from the direct-current voltage;
three first power lines to supply the three-phase alternating-current voltage to the first permanent magnet synchronous motor;
three second power lines to supply the three-phase alternating-current voltage to the second permanent magnet synchronous motor;
at least two disconnection contactors to switch between connection and disconnection of each of at least two of the three second power lines;
at least two short-circuit contactors to switch between connection and disconnection between the two second power lines of each of at least two of pairs of the three second power lines; and a controller to control the at least two disconnection contactors and the at least two short-circuit contactors.

\* \* \* \* \*